US009650970B2

(12) United States Patent
Tseng

(10) Patent No.: US 9,650,970 B2
(45) Date of Patent: May 16, 2017

(54) POWER GENERATOR CONTROL APPARATUS OF VEHICLE AND CONTROL METHOD THEREOF

(71) Applicant: KWANG YANG MOTOR CO., LTD, Kaohsiung (TW)

(72) Inventor: Chien-Ping Tseng, Kaohsiung (TW)

(73) Assignee: KWANG YANG MOTOR CO., LTD, Kaohsiung (TW)

( * ) Notice: Subject to any disclaimer, the term of this patent is extended or adjusted under 35 U.S.C. 154(b) by 15 days.

(21) Appl. No.: 14/842,975

(22) Filed: Sep. 2, 2015

(65) Prior Publication Data
US 2016/0069283 A1    Mar. 10, 2016

(30) Foreign Application Priority Data
Sep. 9, 2014   (TW) .............................. 103131024 A

(51) Int. Cl.
*F02D 29/06*      (2006.01)
*B60R 16/03*      (2006.01)

(52) U.S. Cl.
CPC ........... *F02D 29/06* (2013.01); *Y02T 10/7258* (2013.01)

(58) Field of Classification Search
None
See application file for complete search history.

(56) References Cited

U.S. PATENT DOCUMENTS

| 5,081,365 A   | * | 1/1992  | Field    | B60K 6/48    |
|               |   |         |          | 290/45       |
| 6,358,180 B1  | * | 3/2002  | Kuroda   | B60K 6/48    |
|               |   |         |          | 477/183      |
| 6,457,351 B1  | * | 10/2002 | Yamamoto | G01M 17/0072 |
|               |   |         |          | 73/116.05    |
| 2009/0201650 A1 | * | 8/2009 | Hauser  | A01D 34/78   |
|               |   |         |          | 361/736      |
| 2013/0151110 A1 | * | 6/2013 | Hashimoto | B60W 30/18 |
|               |   |         |          | 701/99       |

FOREIGN PATENT DOCUMENTS

TW             I438105         5/2014

* cited by examiner

*Primary Examiner* — Rami Khatib
(74) *Attorney, Agent, or Firm* — WPAT, PC; Justin King

(57) ABSTRACT

Disclosed are a vehicle power generation control method and an apparatus thereof, wherein, when conditions: a gear is in a target gear state, the gear is in a locked state, a handbrake is in a parking state, opening of an accelerator is in a zero state, an emergency stop switch is in a state of sending a signal, and a temperature of a generator is in a state of a working temperature are established at the same time, the vehicle awaits orders to switch to the power generation mode, otherwise a warning signal is sent. After the vehicle enters into the power generation mode to make the generator generate power to supply power, when the conditions aforementioned are established at the same time, the power generation action is continuously performed, and electricity is cut off from the vehicle when any one of the conditions is not established.

19 Claims, 9 Drawing Sheets

POWER GENERATOR CONTROL APPARATUS OF VEHICLE AND CONTROL METHOD THEREOF

CROSS-REFERENCE TO RELATED APPLICATION

This application claims the benefit of Taiwan Patent Application No. 103131024, filed on Sep. 9, 2014, which is hereby incorporated by reference for all purposes as if fully set forth herein.

BACKGROUND

Technical Field

The present disclosure relates to a power generation control apparatus of a vehicle and a control method thereof, and more particularly to a power generation control apparatus of a vehicle and a control method thereof which combines a safe power supply method and apparatus of a vehicle power system and a power generation system, and has safety detection and judgment capability before power supply and capability to switch to an anti-theft security state before and after the power supply.

Related Art

Common small vehicles in occasions such as existing farms, pastures and golf courses are known as vehicles or all-terrain multi-purpose vehicles, the vehicle drives the vehicle to move through operation of an engine, the engine will drive a generator to operate via a crankshaft during operation, to make electric power generated by operation of the generator supplied to the vehicle per se for use, however, the electric power can only be supplied to the vehicle per se for use, if an electric appliance that uses additional electric power is required, a portable generator may be generally disposed on the vehicle, while electric power generated by the portable generator can be supplied to external electric appliances for use. Referring to FIG. 1, FIG. 1 illustrates a portable generator P generally common on the market, which has a body M that uses a fuel engine to generate electric power and an operation interface I electrically connected with the body M, the operation interface I has multiple sockets, circuit breakers, toggle switches and the like, but the operation interface I is fixedly connected with the body M, when correspondingly applied to a multi-purpose vehicle or an all-terrain multi-purpose vehicle, the body M of the portable generator P is fixedly connected with a frame of the vehicle, and thus an external electric appliance can be plugged in the operation interface I to obtain electric power by moving driving to the position of the portable generator; there are still inconveniences in the operation of obtaining the electric power.

In addition, an ROC Patent No. 1438105B discloses a power generation system of a vehicle and a power generation method thereof, which, in a power unit of the vehicle, combines a generator apparatus supplying power outside and functions thereof, can provide external instant power generation and power supply functions on the vehicle through mutual switchover between two modes, i.e., a driving mode and a power generation mode, ensures that, during switchover between the two modes, the vehicle is in a safe and still condition, and incorporates consideration of safety of switchover between the two modes into the process of control over the entire vehicle. However, in the patent, there is still room for improvement to control over safety and anti-theft, and generally, when the vehicle is switched to the power generation mode to supply power, sometimes the vehicle needs to be used for a longer time and cannot be watched at any moment, therefore, it is necessary to design an apparatus and a control method that can take into account both anti-theft and security.

SUMMARY

One objective of the present invention is to provide an accident-proof security control method before a vehicle enters into a power generation mode, and another objective of the present invention is to provide a power generation control apparatus of a vehicle.

The power generation control apparatus of a vehicle provided in the present invention includes the following detection means: a gear detection means that detects a current gear; a gear locking detection means that detects a locked state of the current gear of the vehicle; a handbrake detection means that detects a parking state of a handbrake of the vehicle; an accelerator opening detection means that detects an opening state of an accelerator of the vehicle; an emergency stop switch detection means that detects a state of an emergency stop switch of the vehicle; a generator temperature detection means that detects a temperature state of the generator of the vehicle; and a step of judging according to all the detection means whether the state of the vehicle switches to the power generation mode, wherein a judgment condition includes: a state where the current gear is a target gear, a state where the current gear is locked, a state where the handbrake of the vehicle is parking, a state where opening of the accelerator is zero, a state where the emergency stop switch sends a trigger signal, and a state where the temperature of the generator is a safe working temperature, and when all the states are established at the same time, the vehicle can switch to the power generation mode.

The power generation control apparatus of a vehicle provided in the present invention includes: a gear sensing unit which detects a current gear signal through a sensor disposed on a gearbox of the vehicle, a gear locking sensing unit which senses a locking signal of a shift lever of the vehicle, a handbrake sensing unit which senses a handbrake signal, an accelerator opening sensing unit which detects an accelerator opening signal, an emergency stop switch detection unit which detects an ON or OFF signal of an emergency stop switch of the vehicle, a generator temperature sensing unit which senses a temperature of a generator, and a power generation mode control circuit used for deciding whether the vehicle executes a power generation mode according to whether the gear signal cuts into a target gear, whether the gear locking signal functions, whether the handbrake signal is in a parking state, whether the accelerator opening signal is zero, whether the emergency stop switch is in a state of sending an ON signal and whether the temperature of the generator has reached a working temperature.

The present invention has the following characteristics: the present invention has a driving mode for normal driving, a power generation mode that supplies power when the vehicle is still, a warning mode that explicitly indicates various parameters required when the vehicle enters into the power generation mode, and a power supply unit electrically connected with primary and secondary circuit breakers and at least one socket for overloading and leakage protection. The present invention, before entry into the power generation mode, detects states such as a gear signal of the vehicle, a gear locking signal, a signal of the handbrake, an accelerator opening signal, an emergency stop switch state and the temperature of the generator, so as to judge that power generation and power supply functions can be provided safely, thus ensuring safety thereof in an all-round way. In addition, the present invention further has a power-generation power-supply switch lock, which constructs an anti-theft security mechanism in cooperation with a main switch lock, in the power generation mode, after the key to the main switch lock is pulled out through the function of the power generation mode control circuit, when anybody touches any apparatus (including pressing the emergency stop switch to send a signal), which can make the vehicle drive, on the vehicle, the entire vehicle will be turned off, to achieve a safe anti-theft function.

DETAILED DESCRIPTION OF DISCLOSED EMBODIMENTS

Figure 1:
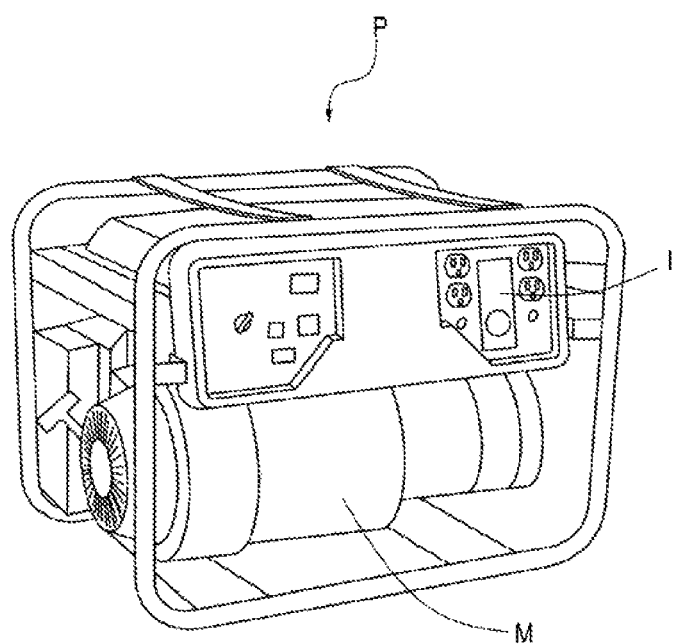
FIG. 1 is a three-dimensional view of a portable generator.

Embodiments of the present invention are described in detail as follows with reference to the accompanying drawings, the accompanying drawings are simplified schematic views and merely describe the basic structure of the present invention in a schematic manner, and thus only elements related to the present invention are marked in the drawings, the displayed elements are not drawn according to the number, shape and dimension scale during implementation, specifications and dimensions thereof during actual implementation are actually a selective design, and layout forms of the elements may be more complicated.

The vehicle of the present invention includes two modes, one is a driving mode and the other is a power generation mode. The driving mode is that a main switch lock electrifies an electronic control unit (ECU) of the vehicle, the ECU controls an engine to operate to drive the vehicle to run, and the power generation mode of the vehicle of the present invention is as shown in FIG. 2 and FIG. 3.

Figure 2:
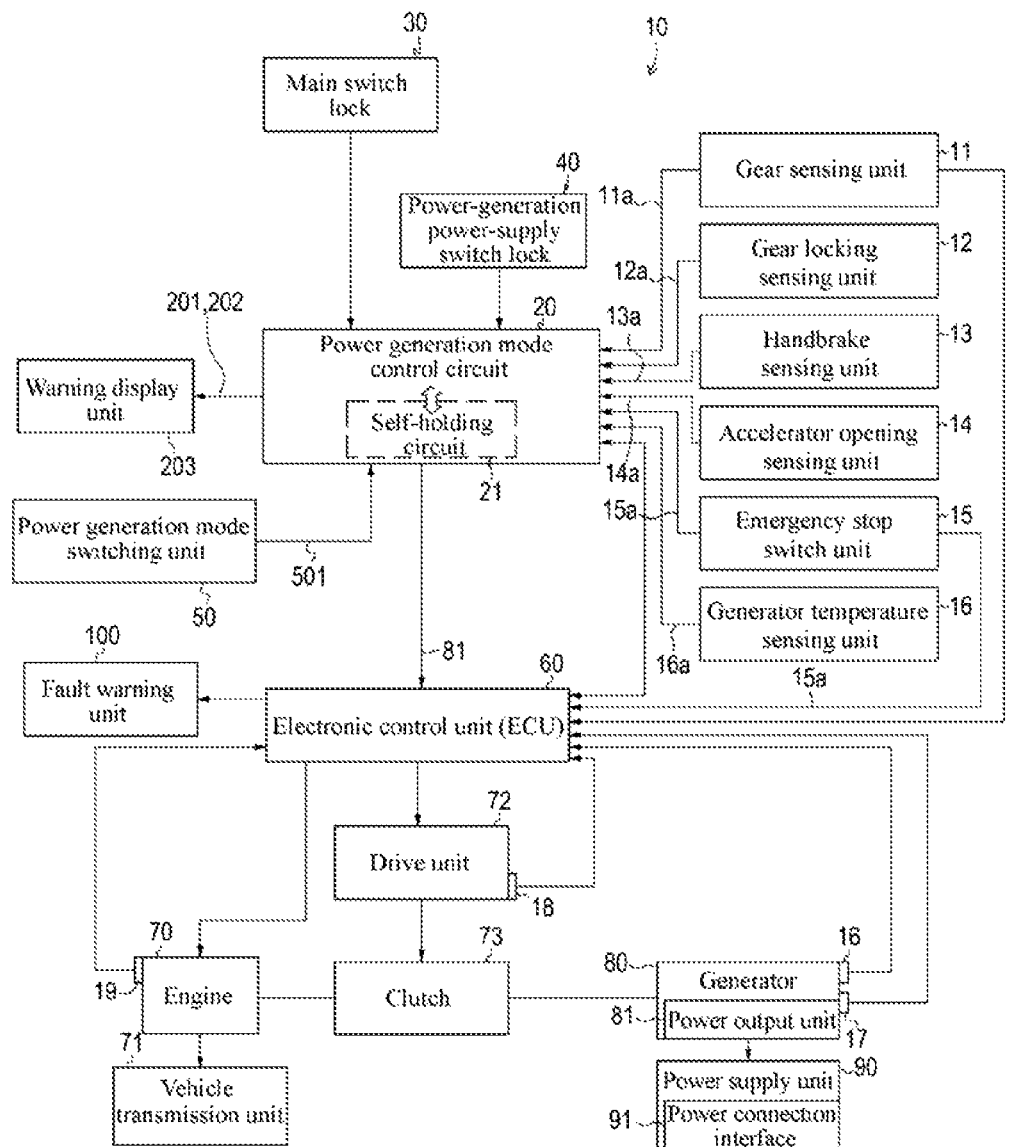
FIG. 2 is a system architecture diagram of a power generation control apparatus of a vehicle according to one embodiment of the present invention.
Figure 3:
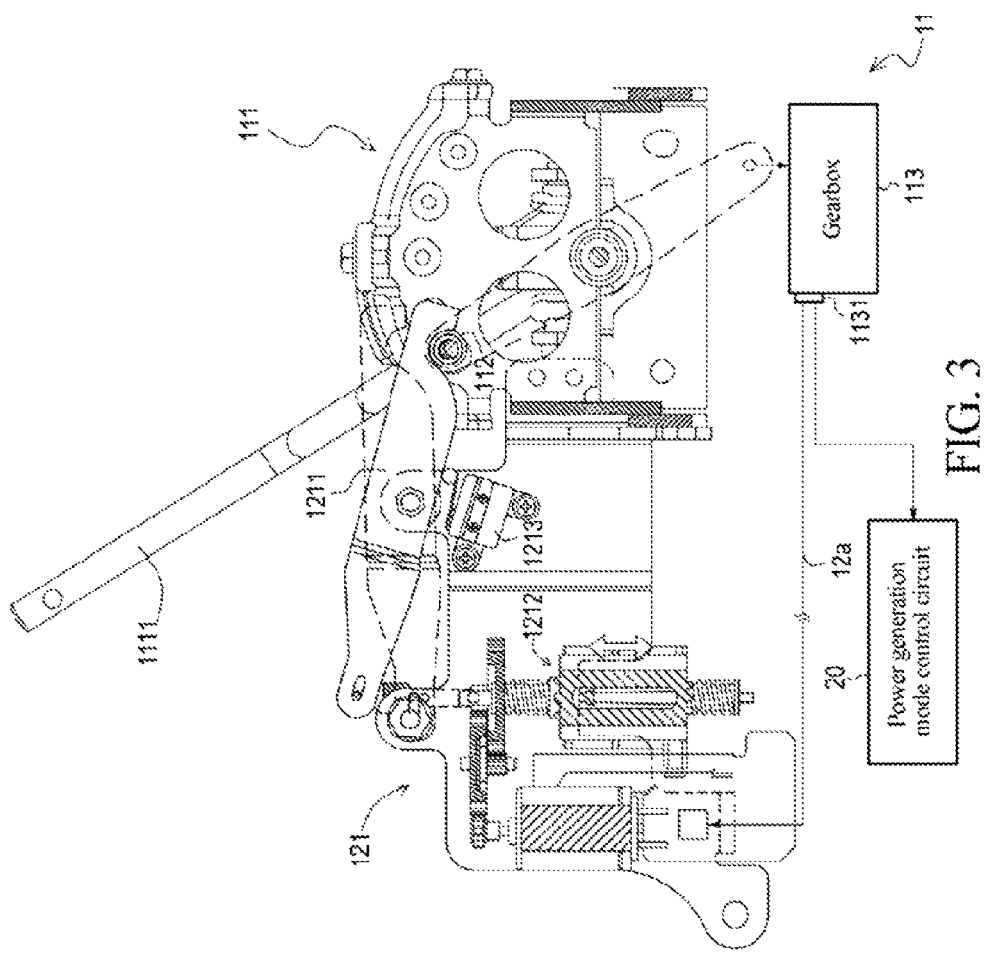
FIG. 3 is one embodiment of the gear locking sensing unit in FIG. 2.

Referring to FIG. 2 and FIG. 3, a power generation control apparatus of a vehicle in this embodiment includes: a gear sensing unit 11, a gear locking sensing unit 12, a handbrake sensing unit 13, an accelerator opening sensing unit 14, an emergency stop switch unit 15, a generator temperature sensing unit 16 and a power generation mode control circuit 20. The gear sensing unit 11 senses a current gear through a gear sensor 1131 disposed on a gearbox 113 of the vehicle, by means of a gear shift action for the gearbox 113 on a shift lever apparatus 111 of the vehicle, after the gear sensing unit 11 senses the current gear, the gear sensing unit 11 reports the current gear to the power generation mode control circuit 20 and a gear locking apparatus 121, to detect what a current gear signal 11a is; the gear locking sensing unit 12 senses a locking signal 12a of a shift lever 1111 of the vehicle through a sensor disposed at the gear locking apparatus 121 (as shown in FIG. 3) of the vehicle 10, specifically, when a rocker arm 1211 of the gear locking apparatus 121 is driven by a driver 1212 to be fastened to a location column 112 of the shift lever 1111, the rocker arm 1211 triggers a trigger switch 1213, and the trigger switch 1213 sends a gear locking signal 12a; the handbrake sensing unit 13 senses a parking signal 13a of the handbrake through a sensor disposed at the handbrake of the vehicle; the accelerator opening sensing unit 14 detects an accelerator opening signal through a sensor disposed at an accelerator of the vehicle; the emergency stop switch unit 15 is used for sending an ON signal or OFF signal 15a generated when the emergency stop switch unit 15 is triggered (for example, a user presses the emergency stop switch unit 15); the generator temperature sensing unit 16 senses a temperature 16a of a generator through a temperature sensor disposed at the generator of the vehicle; the power generation mode control circuit 20 receives the signals (i.e., the current gear signal 11a, the locking signal 12a of the shift lever, the parking signal 13a of the handbrake, the accelerator opening signal 14a, the OFF or ON signal 15a of the emergency stop switch unit, and the temperature 16a of the generator) of the sixth units (i.e., the gear sensing unit 11, the gear locking sensing unit 12, the handbrake sensing unit 13, the accelerator opening sensing unit 14, the emergency stop switch unit 15 and the generator temperature sensing unit 16), used for controlling that the vehicle can execute a power generation mode to supply power outside in a relatively safe state.

Referring to FIG. 2 and FIG. 3, specifically, the vehicle 10 includes a main switch lock 30, the main switch lock 30 may be a keylock switches, the keylock is inserted and rotates to an ON position to form an open state and the keylock rotates to an OFF position and then is pulled out to form a closed state, which is not limited thereto. The vehicle 10 further includes a power-generation power-supply switch lock 40 and a power generation mode switching unit 50, the main switch lock 30, the power-generation power-supply switch lock 40 and the power generation mode switching unit 50 are eclectically connected to the power generation mode control circuit 20 respectively, the power generation mode control circuit 20 receives that the main switch lock 30 and the power-generation power-supply switch lock 40 switch to an open state at the same time, and the power generation mode control circuit 20 further judges the following six states: whether the current gear is a target gear (the target gear may be set as a park position or a neutral position, which cannot co-exist), whether the shift lever 1111 is currently in a locked state, whether the handbrake is currently in a parking state, whether the accelerator opening signal is currently in a zero state, whether the emergency stop switch unit 15 is currently in a state of sending an ON signal and whether the temperature of the generator 80 currently reaches a safe working temperature state, and after the six states are established at the same time, the power generation mode control circuit 20 sends a prompt signal 201 to a warning display unit 203 (the warning display unit 203 may be in a specific form of a lamp), used for reminding a user "the current state of the vehicle passes safety inspection, and related power generation operations can be continued". At this time, the power generation mode control circuit 20 waits for the power generation mode switching unit 50 to send an ON signal 501 (for example, the user presses the switch of the power generation mode switching unit 50), and after the power generation mode control circuit 20 receives the ON signal 501 of the power generation mode switching unit 50, the power generation mode control circuit 20 sends a signal to an ECU 60 of the vehicle, to perform power generation action of the generator through the ECU 60.

In one embodiment, the power generation mode control circuit 20, after judging that the six states are established at the same time, sends a prompt signal 201 to the warning display unit 203, and the power generation mode control circuit 20, when judging that any one of the six states is not established, sends a warning signal 202 to the warning display unit 203, which can be displayed by lamps displaying different colors, for example, the prompt signal 201 is displayed with a green lamp signal, while the warning signal 202 is displayed with a red lamp signal. Certainly, the prompt signal 201 and the warning signal 202 may also be distinguished by using different lamps or different display manners respectively.

The vehicle 10 of the present invention includes an engine 70 (an engine temperature sensor 19 is used to be electrically connected with the ECU 60, to detect the temperature of the engine 70), a vehicle transmission unit 71 separably connecting the engine 70 to drive or not drive the vehicle 10 to run, a clutch 73 driven by a drive unit 72 (a drive unit sensor 18 is used to be electrically connected with the ECU 60, to detect a voltage signal of the drive unit 72 and judge whether the drive unit has successfully driven the clutch 73), and a generator 80 which can be combined with the engine 70 and uses power of the engine 70 to generate power (a generator temperature sensing unit 16 and a generator rotating speed 17 are used respectively to be electrically connected with the ECU 60, to detect a temperature and a rotating speed of the generator 80), and the generator 80 has a power output unit 81 to provide a connection to a power supply unit 90. The power supply unit 90 is electrically connected to the power output unit 81 of the generator 80, and the power supply unit 90 provides a power connection interface 91 (such as a socket) to supply power outside. Reference can be made to the content of the patent TW 1438105B applied by the applicant of the present application for a further specific technology related to the power supply manner: electric power is supplied via a distribution box, the electric power mainly passes through a main leakage overload apparatus to evenly distribute a load apparatus, a load circuit breaker is disposed, the electric power is output via a socket, and the specification of the load circuit breaker cannot be greater than that of the main circuit breaker. Therefore, the technical content is well-known in this technical field and is not described in detail and disclosed in the drawings.

That the power generation action of the generator is performed with the ECU 60 is that the power generation mode control circuit 20 controls a drive unit 72 to drive a clutch 73 for press fit by means of the ECU 60, to link power of the engine 70 and the clutch 73, thereby causing the power of the engine 70 to drive the generator 80 to generate power.

The main switch lock 30 is electrically connected with the power generation mode control circuit 20, which has an open state and a closed state, to open/close power supply required by the vehicle, the main switch lock 30 is preferably a vehicle key, the vehicle key can be removed from the vehicle when the main switch lock 30 switches to the closed state, at this time, if the vehicle is in the power generation mode to perform a power generation operation, the vehicle will enter into an anti-theft security self-holding circuit state (as described later) without stopping the power-generation power-supply operation.

In one embodiment, the vehicle 10 further includes an anti-theft security self-holding circuit 21, the anti-theft security self-holding circuit 21, when the vehicle enters into the power generation mode and the main switch lock 30 is in the closed state (when the main switch lock 30 is in a form of a vehicle key, the key is rotated to the OFF position to send a closed state, and the key can be pulled out of the vehicle 10), cuts off power from the vehicle to stop the power generation action of the generator when any one of the following is not established: whether the current gear is a target gear, whether the shift lever is in a locked state, whether the handbrake is in a parking state and whether the accelerator opening signal is in a zero state; otherwise, when all the conditions are established, the power generation mode control circuit 20 maintains continuation of the power generation action of the generator, and during power generation of the generator, when the power generation mode control circuit 20 receives that the emergency stop switch unit 15 sends an OFF signal (i.e., the emergency stop switch unit 15 is being pressed at this time to send a signal), power of the vehicle 10 is immediately cut off, to stop the power generation action; moreover, the main switch lock 30 has been closed previously, and the vehicle 10 then goes back to a normal state where the main switch lock 30 is cut off and does not generate power. In other words, when the main switch lock 30 is rotated to the closed state, the keylock can be pulled from the vehicle 10, and at this time, in addition to continuation of the power generation and power supply functions, the driving function of the vehicle is basically closed.

Figure 4:
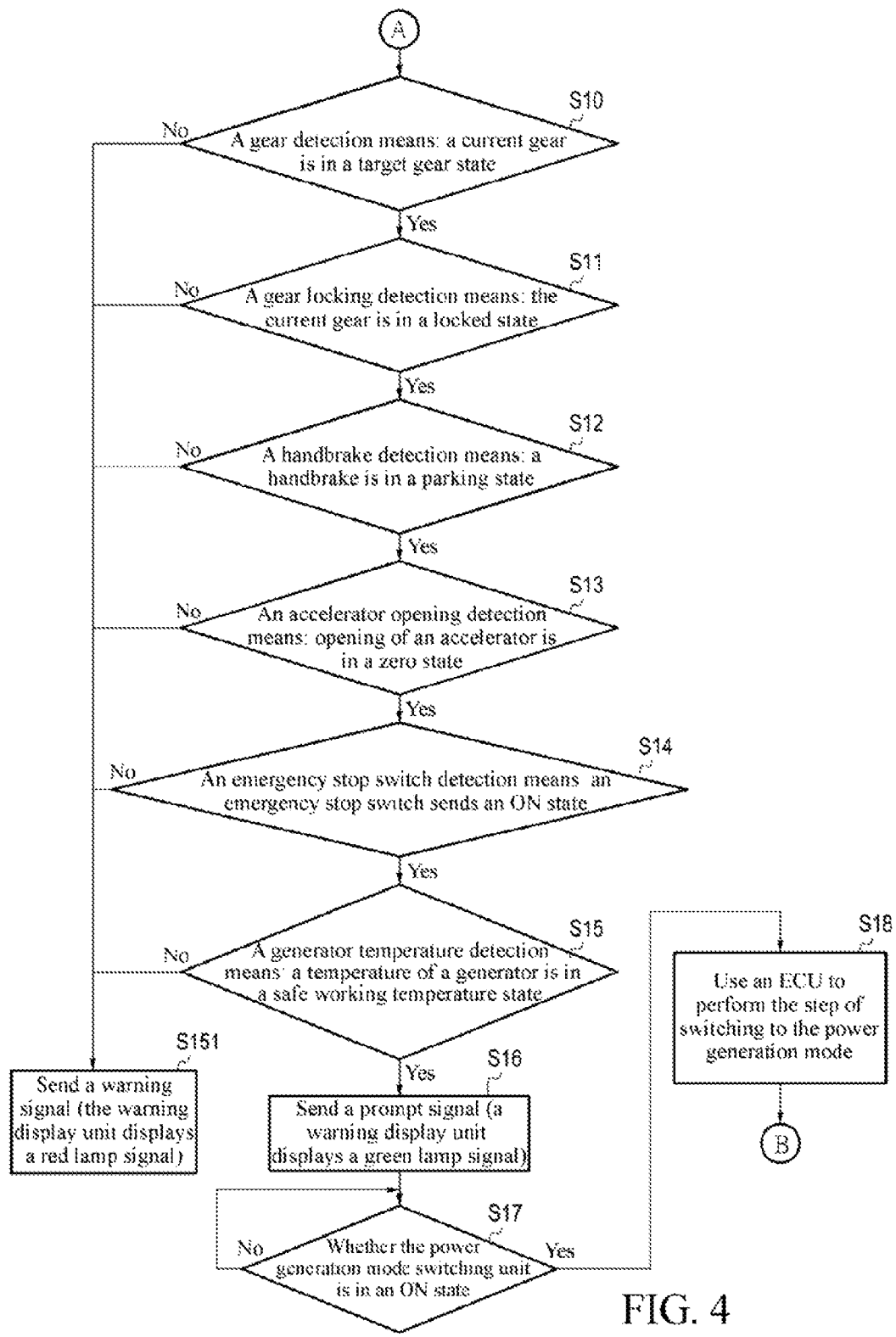
FIG. 4 is a flowchart of a power generation control method of a vehicle according to one embodiment of the present invention.
Figure 5:
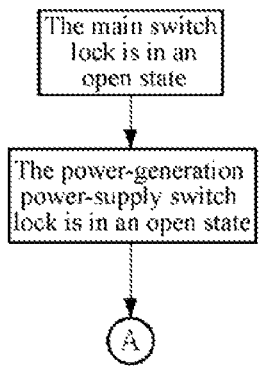
FIG. 5 is a flowchart of early validation about that a main switch lock and a power-generation power-supply switch lock signal to switch to a power generation mode and power generation power supply according to one embodiment of the present invention.

Referring to FIG. 4 and FIG. 5, the vehicle further includes a main switch lock 30 and a power-generation power-supply switch lock 40, and when they are in an open state at the same time, power can be supplied to the power generation mode control circuit 20 (as shown in FIG. 5), or the power generation mode control circuit 20 begins to perform the action of judging a power generation condition according to various detection means (as shown by a connecting sign A of the flowchart in FIG. 4). A power generation control method of a vehicle in this embodiment includes: a gear detection means, used for detecting a current gear (step S10); a gear locking detection means, used for detecting a locked state of the current gear of the vehicle (step S11); a handbrake detection means, used for detecting a parking state of a handbrake of the vehicle (step S12); an accelerator opening detection means, used for detecting an opening state of an accelerator of the vehicle (step S13); an emergency stop switch detection means, used for detecting a state of an emergency stop switch of the vehicle (step S14); a generator temperature detection means, used for detecting a temperature state of the generator of the vehicle (step S15); and switching to the power generation mode, to judge according to all the detection means that a state of the vehicle includes: a first condition (detecting whether the current gear is in a target gear state), a second condition (detecting whether the current gear is in a locked state), a third condition (detecting whether the handbrake of the vehicle is in a parking state), a fourth condition (detecting whether opening of the accelerator is in a zero state), a fifth condition (detecting whether the emergency stop switch sends an ON state), and a sixth condition (detecting whether the temperature of the generator is in a working temperature state), wherein when the first to sixth conditions are established at the same time, the vehicle can switch to the power generation mode. In one preferred embodiment, when the first to sixth conditions are established at the same time, the power generation mode control circuit 20 sends a prompt signal 201 (step S16), to make the warning display unit 23 display a green lamp signal, thereby prompting that next step of the power generation mode can be performed, and when any one of the first to sixth conditions is not established, the power generation mode control circuit 20 sends a warning signal 202 (step S151), to make the warning display unit 23 display a red lamp signal, thereby warning that next step of the power generation mode cannot be performed.

The vehicle 10 further includes a main switch lock 30 and a power-generation power-supply switch lock 40, and when the main switch lock 30 and the power-generation power-supply switch lock 40 are in an open state at the same time, power is supplied to the power generation mode control circuit 20; or when the main switch lock 30 is started, the power generation mode control circuit 20 obtains electric power, and after it is detected that the power-generation power-supply switch lock 40 is in an open state, judgment on the first to sixth conditions is performed.

Referring to FIG. 4, the power generation mode uses a power generation mode switching unit 50 (as shown in FIG. 2) to send an ON signal 501, the power generation mode control circuit 20, after receiving the ON signal 501 of the power generation mode switching unit 50, sends a signal to the ECU 60, and after the power generation mode control circuit 20 receives simultaneous establishment of the first to sixth conditions (step S11-step S15) and the ON signal 501 of the power generation mode switching unit 50, the power generation mode control circuit 20 sends a signal to the ECU 60, to perform the power generation action of the generator 80 (step S18).

Figure 6:
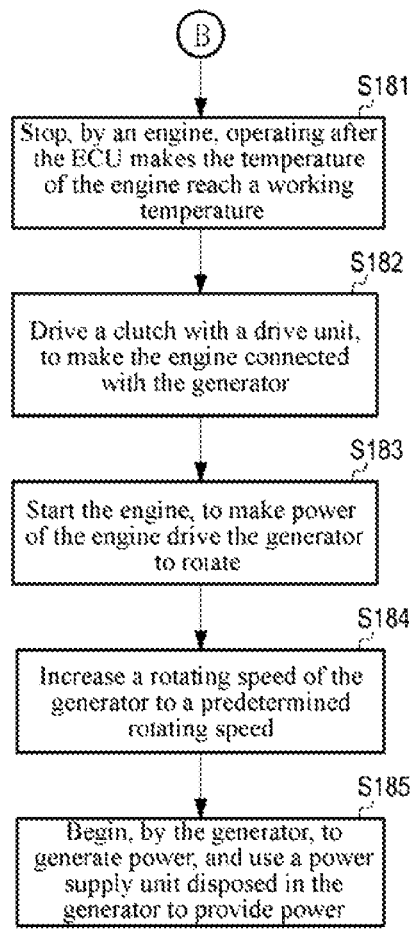
FIG. 6 is a flowchart of judging whether the state of the vehicle is suitable for switching to the power generation mode according to one embodiment of the present invention.

Referring to FIG. 6, the step of "the ECU performs the power generation action of the generator"(i.e., the step below the connecting sign B of the flowchart of FIG. 6) includes: after the temperature of the engine reaches the working temperature, the engine stops operating (step S181), the ECU 60 sends an engine start signal to make the engine operate, and after the working temperature of the engine is reached, the ECU 60 sends an engine shutdown signal, to cause the engine to stop operating, and a drive unit drives the clutch to connect the generator with the engine, so that power of the engine can be transferred to the generator (step S182); the engine is started, to make the power of the engine drive the generator to rotate (step S183); a rotating speed of the generator is increased to a predetermined rotating speed (step S184); and the generator begins to generate power, and a power supply unit disposed at the generator is used to provide electric power (step S185).

Figure 7:
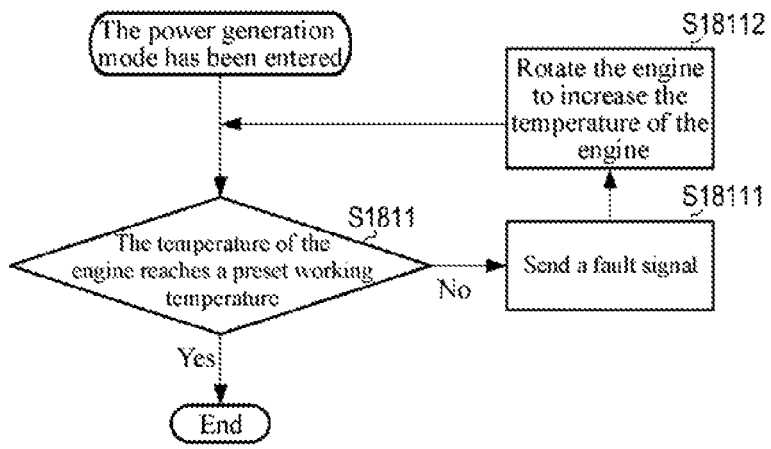
FIG. 7 is a flowchart of judging a temperature of an engine and further controlling the temperature of the engine in FIG. 6.

It should be noted that the pre-operation in the power generation action of the generator 80 (step S18) may include a fault detection function, for example, As shown in FIG. 7, after entry into the power generation mode, in the process of "making the temperature of the engine reach a working temperature (step S181)", the ECU 60 further judges whether the temperature of the engine reaches a preset working temperature (step S1811), if no, it indicates that operation of the engine 70 cannot reach a working temperature suitable for power generation, and thus the ECU 60 may first send a fault signal (step S18111), to order a fault warning unit 100 to display a fault lamp signal, the engine tries to rotate to increase the temperature of the engine (step S18112), and step S1811 is re-preformed to judge the temperature.

Figure 8:
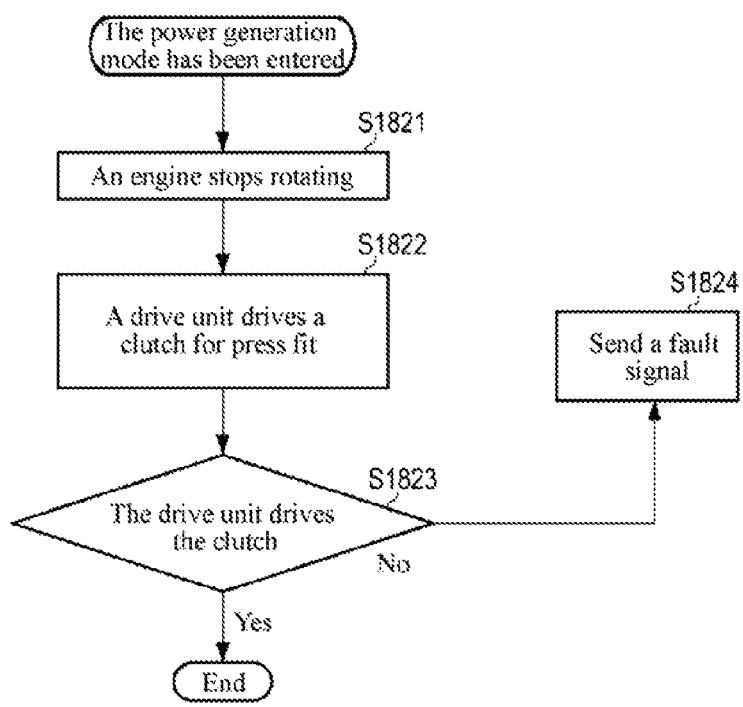
FIG. 8 is a flowchart showing that the engine is attached to the generator and whether a clutch is in press fit is further verified in FIG. 6.

As shown in FIG. 8, after entry into the power generation mode, in the process of "driving the clutch with a drive unit, so that power of the engine can be transferred to the generator (step S182)", the ECU 60 further stops the engine from rotating (step S1821), then makes the drive unit 72 to drive the clutch 73 to perform a press action (step S1822), to connect the engine 70 with the generator 80 through the clutch 73, and judges whether the drive unit 72 has indeed driven the clutch 73, if the clutch 73 cannot be driven, a fault signal is sent (step S1824), to make the fault display unit 100 display a fault lamp signal, to wait for removal of fault. Specifically, one of the methods of confirming that the clutch 73 is in a correct position may use a drive unit sensor 18 to detect a voltage signal of the drive unit 72, to judge whether the drive unit 72 normally operates.

Figure 9:
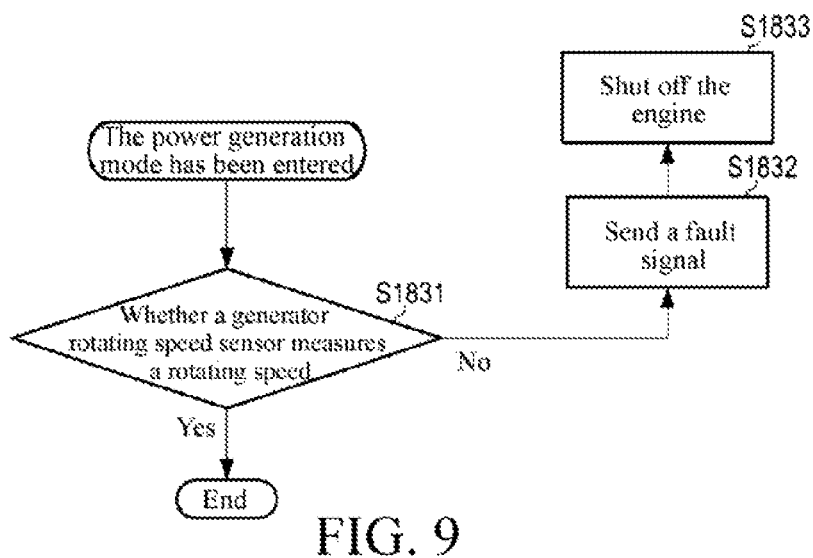
FIG. 9 is a flowchart showing that the engine drives the generator and whether the generation is driven is further verified in FIG. 6.

As shown in FIG. 9, after entry into the power generation mode, in the process "starting the engine, to cause power of the engine to drive the generator to rotate (step S183)", the ECU 60 further judges whether the generator rotating speed sensor 17 detects a rotating speed (step S1831), to confirm whether the generator 80 has indeed been driven by the power of the engine 70 to operate, if no, a fault signal is sent (step S1832), and the ECU 60 sends a signal to turn off the engine (step S1833), to wait for removal of fault.

Figure 10:
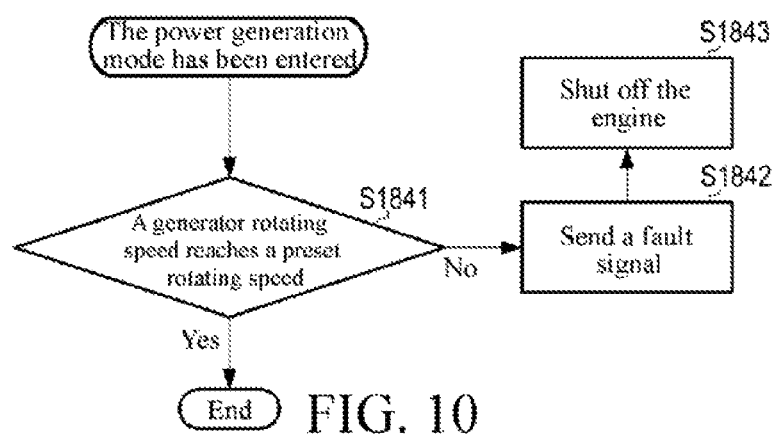
FIG. 10 is a flowchart of improving a rotating speed of the generator and further verifying the rotating speed of the generator in FIG. 6.

As shown in FIG. 10, after entry into the power generation mode, in the process "increasing a rotating speed of the generator to a predetermined rotating speed (step S184)", the ECU 60 further judges whether a rotating speed of the generator reaches a preset rotating speed with the generator rotating speed sensor 17 (step S1841), if no, a fault signal is sent (step S1842), and the ECU 60 sends a signal to turn off the engine (step S1843), to wait for removal of fault. In addition, the predetermined rotating speed is preferably 3600 RPM, but is not limited thereto.

In one embodiment, the fault signal may be presented with flashing light, to strengthen a reminding force.

Figure 11:
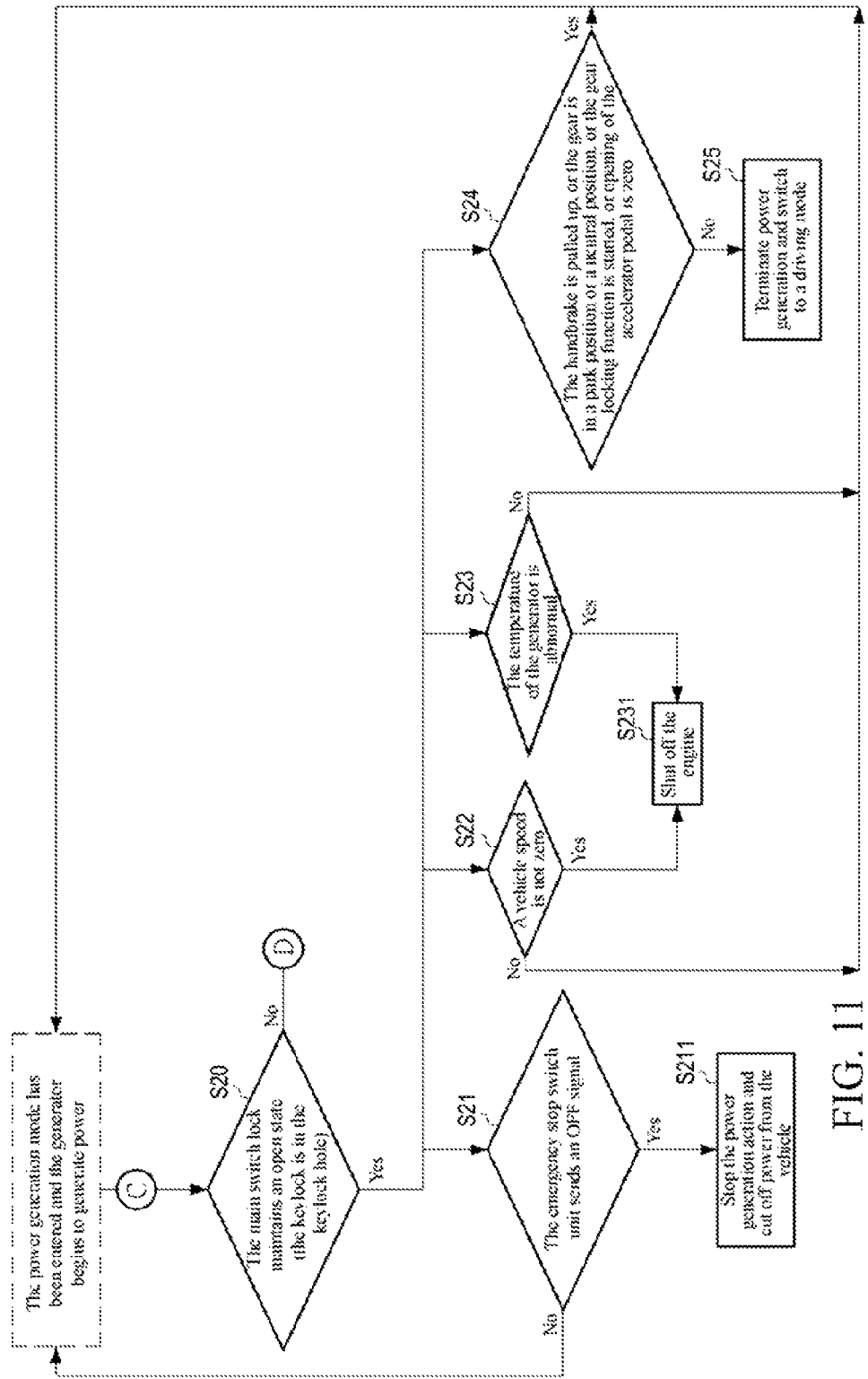
FIG. 11 is a flowchart of safety of the vehicle and protection over a generator system during power generation after entry into the power generation mode and switch back to the driving mode according to one embodiment of the present invention.
Figure 12:
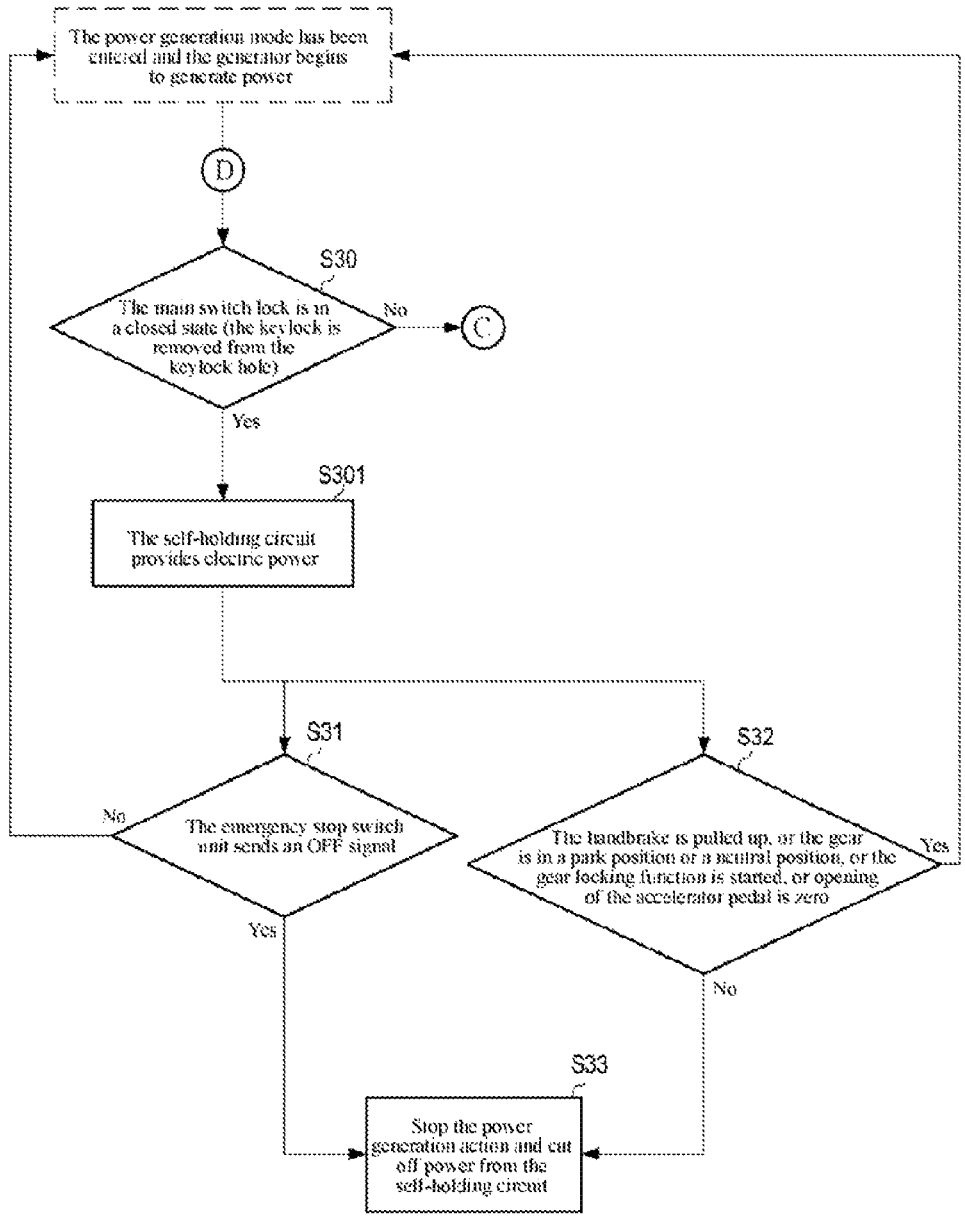
FIG. 12 is a flowchart of a self-holding circuit and anti-theft security during power generation after entry into the power generation mode according to one embodiment of the present invention.

As shown in FIG. 11, after the vehicle has entered into the power generation mode and the generator begins to generate power, the step below the connecting sign C in the flowchart of FIG. 11 is performed: whether the main switch lock 30 is in an open state, that is, the keylock of the main switch lock 30 is in the keylock hole (step S20); when the main switch lock 30 is in a closed state, the step of the connecting sign D in the flowchart of FIG. 12 is performed; when the main switch lock 30 is in an open state, after the power generation mode control circuit 20 and the ECU 60 receive the OFF signal of the emergency stop switch unit 15 (step S21), the power generation mode control circuit 20 sends a signal to the ECU 60, the ECU 60 sends a signal to make the drive unit 72 to drive the clutch 73, making the engine 70 disconnected from the generator 80, the power generation action stops, and the ECU 60 cuts off power from the vehicle (step S211) at the same time; when the ECU 60 receives that a vehicle speed sensor (not shown) detects that the speed of the vehicle suddenly has a speed (for example, artificially moved by an external force, stop on a slope to slide down . . . etc.) (step 22), the ECU 60 sends a signal to turn off the engine 70 (step 231); when the power generation mode control circuit 20 receives that the generator temperature sensor senses that the temperature of the generator is abnormal (step 23), the power generation mode control circuit 20 sends a signal to the ECU 60, and the ECU 60 sends a signal to turn off the engine of the vehicle (step 231); when the power generation mode control circuit 20 judges the first to fourth conditions according to the corresponding sensors (step S24): the conditions are established at the same time, the power generation mode control circuit 20 and the ECU 60 do not interrupt the power generation action of the generator; when any one of the first to fourth conditions is not established, the power generation mode control circuit 20 sends a signal through the ECU 60 to make the vehicle terminate power generation and switch to a driving mode (step S25).

As shown in FIG. 12, during power generation of the generator 80, when the main switch lock 30 is in an ON state, refer to the step of the connecting sign C in the flowchart of FIG. 11; during power generation of the generator 80, when the main switch lock 30 is in an OFF state, this embodiment provides an unattended power generation, anti-theft security function; after the vehicle has entered into the power generation mode and power generation begins, the user can switch the main switch lock 30 to the OFF state to pull the keylock out of the vehicle (step S30), at this time, the vehicle can use a self-holding circuit 21 to turn on a relay to supply power continuously (step S301), to maintain the power generation action of the generator, the power generation mode control circuit 20 and the ECU 60 judge whether an OFF signal sent by the emergency stop switch unit 50 is received (step S31), when the power generation mode control circuit 20 and the ECU 60 do not receive the OFF signal sent by the emergency stop switch unit 50, the ECU 60 continuously performs the power generation action, when the power generation mode control circuit 20 and the ECU 60 receive the OFF signal sent by the emergency stop switch unit 50, the power generation mode control circuit 20 sends a signal to the ECU 60, the ECU 60 sends a signal to make the drive unit 72 drive the clutch 73, to cause the engine 70 to be disconnected from the generator 80, and the power generation action stops, the ECU 60 cuts off power from the vehicle at the same time, and the ECU 60 sends a signal to make the vehicle stop the power generation action and turns off the self-holding circuit 21 (step S33), to completely shut off the vehicle; the power generation mode control circuit 20 judges the first to fourth conditions according to the corresponding sensors (step S32), when the power generation mode control circuit 20 receives a signal indicating that the first to fourth conditions are established at the same time, the ECU 60 continues the power generation action, and when the power generation mode control circuit 20 receives a signal indicating that any one of the first to fourth conditions is not established, the ECU 60 sends a signal to make the vehicle stop the power generation action and turns off the self-holding circuit 21 (step S33), to completely shut off the vehicle. Step S31 to step S33 and step S32 to step S33 mainly function to turn off the self-holding circuit 21 that maintains power source for operation of the vehicle to prevent that animals, children or other persons mistakenly touch the vehicle or make an action to drive the vehicle when the vehicle is in the power generation mode and unattended, so as to prevent danger.

The self-holding circuit 21 is a self-holding circuit 21 formed by an application relay (not shown) designed additionally outside the power supply circuit of the main switch lock 30 (during specific implementation, it is likely that the main switch lock 30 is connected in parallel with the self-holding circuit 21), and the self-holding circuit 21 accepts that the power generation mode control circuit 20 controls its breakover action. After the power generation mode control circuit 20 receives the ON signal 501 of the power generation mode switching unit 50, while the power generation mode control circuit 20 sends a signal to the ECU 60 of the vehicle to perform the power generation action of the generator 80 through the ECU 60, the power generation mode control circuit 20 sends a signal to excite the relay on the self-holding circuit 21 to turn on the self-holding circuit 21, so that the power generation mode control circuit 20 can be maintained subsequently after power failure of the main switch lock 30, and the ECU 60 and electronic elements on related circuits obtain electric power.

The state where the accelerator opening is zero is a state where the pedal of the accelerator is not trampled; the method of using a gear detection means to detect a current gear uses a gear sensing unit 11 on a gearbox 113 to detect the current gear; the current gear of the gear detection means is a park position (P) or a neutral position (N), when the shift lever apparatus 111 is provided with a park position, the target gear is set as the a park position, and when the shift lever apparatus 111 is not provided with a park position but only with a neutral position, the target gear is set as the neutral position.

It should be emphasized that, after the vehicle has entered into the power generation mode, whether the main switch lock 30 is in an open state or a closed state, after the power generation mode control circuit 20 and the ECU 60 receive the OFF signal of the emergency stop switch unit 15 (for example, at this time, the emergency stop switch unit 15 is pressed to send a signal), the power generation mode control circuit 20 sends a signal to the ECU 60 to stop the power generation mode, the ECU 60 sends a signal to make the drive unit 72 drive the clutch 73, to cause the engine 70 to be disconnected from the generator, the power generation action stops, and the ECU 60 cuts off power from the vehicle (as shown in FIG. 11 and FIG. 12).

The above merely describes preferred implementations or embodiments of technical means adopted by the present invention for solving the problems presented, but are not intended to limit the scope of implementation of the present invention patent. Equivalent variations and modifications literally in line with the scope of the present invention or made within the scope of the present invention should fall within the scope of the present invention.

What is claimed is:

1. A power generation control method of a vehicle, applied to that a generator of the vehicle enters into a power generation mode, the power generation control method of the vehicle comprising:
   a gear detection state, used for detecting a current gear;
   a gear locking detection state, used for detecting a locked state of the current gear of the vehicle;
   a handbrake detection state, used for detecting a parking state of a handbrake of the vehicle;
   an accelerator opening detection state, used for detecting an opening state of an accelerator of the vehicle;

an emergency stop switch detection state, used for detecting a state of an emergency stop switch of the vehicle;
a generator temperature detection state, used for detecting a temperature state of the generator of the vehicle; and
switching to the power generation mode, to judge according to all the detection state that a state of the vehicle comprises: a first condition of detecting whether the current gear is in a target gear state, a second condition of detecting whether the current gear is in a locked state, a third condition of detecting whether the handbrake of the vehicle is in a parking state, a fourth condition of detecting whether opening of the accelerator is in a zero state, a fifth condition of detecting whether the emergency stop switch sends an ON state, and a sixth condition of detecting whether the temperature of the generator is in a working temperature state, wherein when the first to sixth conditions are established, the vehicle can switch to the power generation mode, wherein the power generation mode uses a power generation mode switching unit to send an ON signal, and after a power generation mode control circuit receives simultaneous establishment of the first to sixth conditions and the ON signal of the power generation mode switching unit, the power generation mode control circuit sends a signal to an electronic control unit (ECU), to perform a power generation action of the generator.

2. The power generation control method of the vehicle according to claim 1, wherein the step of switching to the power generation mode operates with a power generation mode control circuit, the vehicle further comprises a main switch lock and a power-generation power-supply switch lock, and the main switch lock and a power-generation power-supply switch lock are in an open state at the same time to supply power for the power generation mode control circuit.

3. The power generation control method of the vehicle according to claim 2, wherein, when the power generation mode control circuit is used to judge that the first to sixth conditions are established at the same time, the power generation mode control circuit sends a prompt signal, when any condition of the first to sixth conditions is not established, the power generation mode control circuit sends a warning signal, the prompt signal is displayed with a green lamp signal, and the warning signal is displayed with a red lamp signal.

4. The power generation control method of the vehicle according to claim 1, wherein that the ECU performs a power generation action of the generator comprises:
stopping, by an engine, operating after the ECU makes the temperature of the engine reach a working temperature;
driving a clutch with a drive unit, to make the engine connected with the generator;
starting the engine, to make power of the engine drive the generator to rotate;
increasing a rotating speed of the generator to a predetermined rotating speed; and
beginning, by the generator, to generate power, and using a power supply unit disposed in the generator to provide power.

5. The power generation control method of the vehicle according to claim 4, wherein, when the ECU senses that the temperature of the engine does not reach the working temperature according to an engine temperature sensor, senses that the drive unit does not drive the clutch according to a drive unit sensor or senses that the generator has no rotating speed or the rotating speed of the generator does not reach the predetermined rotating speed according to a generator rotating speed sensor, the ECU sends a corresponding fault signal, and the fault signal is presented with flashing light.

6. The power generation control method of the vehicle according to claim 1, wherein, when the power generation mode control circuit is provided with a self-holding circuit which can, when the main switch lock cuts off power, maintain operation of the power generation mode control circuit and the ECU, after the power generation mode control circuit receives the ON signal of the power generation mode switching unit, the power generation mode control circuit sends a signal to turn on the self-holding circuit, to continuously supply power, when the power generation mode control circuit and the ECU do not receive an OFF signal sent by the emergency stop switch unit, the ECU continuously performs the power generation action, when the power generation mode control circuit and the ECU receive the OFF signal sent by the emergency stop switch unit, the ECU sends a signal to order the vehicle to stop the power generation action and simultaneously turns off the self-holding circuit to completely cut off electricity from the vehicle; when the power generation mode control circuit receives a signal indicating that any condition of the first to fourth conditions is not established, the ECU sends a signal to order the vehicle to stop the power generation action and simultaneously turns off the self-holding circuit to completely cut off electricity from the vehicle.

7. The power generation control method of the vehicle according to claim 6, wherein, after the power generation mode control circuit and the ECU receive the OFF signal sent by the emergency stop switch unit, the power generation mode control circuit sends a signal to the ECU, to stop the power generation action of the generator, and the ECU cuts off power from the vehicle at the same time.

8. The power generation control method of the vehicle according to claim 1, wherein, after the vehicle enters into the power generation mode, when the main switch lock is in an open state, and when a vehicle speed sensor detects that a speed of the vehicle is not zero, the ECU sends a signal to shut off the engine of the vehicle.

9. The power generation control method of the vehicle according to claim 8, wherein, after the power generation mode control circuit and the ECU receive the OFF signal sent by the emergency stop switch unit, the power generation mode control circuit sends a signal to the ECU, to stop the power generation action of the generator, and the ECU cuts off power from the vehicle at the same time.

10. The power generation control method of the vehicle according to claim 1, wherein, after the vehicle enters into the power generation mode, when the main switch lock is in an open state, and when the generator temperature sensor senses that the temperature of the generator is abnormal, the ECU sends a signal to shut off the engine of the vehicle.

11. The power generation control method of the vehicle according to claim 10, wherein, after the power generation mode control circuit and the ECU receive the OFF signal sent by the emergency stop switch unit, the power generation mode control circuit sends a signal to the ECU, to stop the power generation action of the generator, and the ECU cuts off power from the vehicle at the same time.

12. The power generation control method of the vehicle according to claim 1, wherein a state where opening of the accelerator is zero is a state where the pedal of the accelerator is not trampled.

13. The power generation control method of the vehicle according to claim 1, wherein the method of using a gear detection state to detect a current gear uses a gear sensing unit on a gearbox to detect the current gear.

14. The power generation control method of the vehicle according to claim 1, wherein the target gear of the gear detection state is a park position or a neutral position.

15. A power generation control apparatus of a vehicle, comprising:
a gear sensing unit, which detects a current gear signal through a sensor disposed on a gearbox of the vehicle;
a gear locking sensing unit, which senses a locking signal of a shift lever of the vehicle through a sensor disposed at a gear locking apparatus of the vehicle;
a handbrake sensing unit, which senses a parking signal of a handbrake through a sensor disposed at the handbrake of the vehicle;
an accelerator opening sensing unit, which detects an accelerator opening signal through a sensor disposed at an accelerator of the vehicle;
an emergency stop switch unit, used for sending an ON or OFF signal generated by the emergency stop switch unit;
a generator temperature sensing unit, which senses a temperature of a generator through a temperature sensor disposed at the generator of the vehicle; and
a power generation mode control circuit, which receives the signals of the six units, used for deciding whether the vehicle executes a power generation mode,
wherein the vehicle comprises a main switch lock, a power-generation power-supply switch lock, a power generation mode switching unit and an electronic control unit (ECU), the main switch lock, the power-generation power-supply switch lock, the power generation mode switching unit and the ECU are electrically connected to the power generation mode control circuit respectively, after the power generation mode control circuit receives that the main switch lock and the power-generation power-supply switch lock are in an open state at the same time, the current gear is a target gear, the shift lever is in a locked state, the handbrake is in a parking state, the accelerator opening signal is in a zero state, the emergency stop switch unit sends an ON state and the temperature of the generator reaches a working temperature state, i.e., the six states are established at the same time, the power generation mode control circuit sends a signal to the ECU, and performs power generation action of the generator through the ECU.

16. The power generation control apparatus of the vehicle according to claim 15, wherein the vehicle comprises a warning display unit which can display different colors, used for displaying lamp signals by the warning display unit when the power generation mode control circuit sends a prompt signal, and after the power generation mode control circuit detects that any one of the six states is not established, the power generation mode control circuit sends a warning signal and the warning display unit displays the lamp signals in different colors.

17. The power generation control apparatus of the vehicle according to claim 15, wherein the performing power generation action of the generation is controlling a drive unit to drive a clutch for press fit by using the ECU, and connecting an engine with the generator, to cause power of the engine to drive the generator to generate power.

18. The power generation control apparatus of the vehicle according to claim 15, wherein the drive unit has a drive unit sensor, used for sensing a voltage signal of the drive unit.

19. The power generation control apparatus of the vehicle according to claim 15, wherein the target gear is a park position or a neutral position.

* * * * *